(12) United States Patent
Luce et al.

(10) Patent No.: US 10,641,685 B2
(45) Date of Patent: May 5, 2020

(54) SHOCK STRUT SERVICE MONITORING USING GAS PRESSURE AND TEMPERATURE SENSORS, COMBINED WITH PHYSICAL STRUT MEASUREMENT AND TAKING INTO ACCOUNT GAS ABSORPTION/DESORPTION IN A FLUID

(71) Applicant: Goodrich Corporation, Charlotte, NC (US)

(72) Inventors: William E Luce, Colleyville, TX (US); Amir Fazeli, Ontario (CA)

(73) Assignee: Goodrich Corporation, Charlotte, NC (US)

( * ) Notice: Subject to any disclaimer, the term of this patent is extended or adjusted under 35 U.S.C. 154(b) by 239 days.

(21) Appl. No.: 15/672,075

(22) Filed: Aug. 8, 2017

(65) Prior Publication Data

US 2018/0058985 A1 Mar. 1, 2018

Related U.S. Application Data

(60) Provisional application No. 62/381,392, filed on Aug. 30, 2016.

(51) Int. Cl.
*G01M 17/04* (2006.01)
*B64F 5/60* (2017.01)
*B64C 25/60* (2006.01)

(52) U.S. Cl.
CPC ............. *G01M 17/04* (2013.01); *B64C 25/60* (2013.01); *B64F 5/60* (2017.01)

(58) Field of Classification Search
CPC ........... G01M 17/04; B64C 25/60; B64F 5/60
(Continued)

(56) References Cited

U.S. PATENT DOCUMENTS 6,293,141 B1 9/2001 Nance
8,565,968 B2 10/2013 Nance
(Continued)

FOREIGN PATENT DOCUMENTS

DE 19841127 2/2000
WO 2013178998 12/2013

OTHER PUBLICATIONS

European Patent Office, Partial European Search Report dated Feb. 7, 2018 in Application No. 17187627.9-1001.
(Continued)

*Primary Examiner* — Khoi H Tran
*Assistant Examiner* — Rodney P King
(74) *Attorney, Agent, or Firm* — Snell & Wilmer, L.L.P.

(57) ABSTRACT

A method for monitoring a shock strut may comprise measuring a first shock strut pressure, measuring a first shock strut temperature, measuring a second shock strut pressure, measuring a second shock strut temperature, measuring a shock strut stroke, and determining a servicing condition of the shock strut based upon the first shock strut pressure, the first shock strut temperature, the second shock strut pressure, the second shock strut temperature, and the shock strut stroke and taking into account at least one of an absorption of a gas with a fluid and desorption of the gas with the fluid.
In various embodiments, the method may further comprises measuring a third shock strut pressure, measuring a third shock strut temperature, wherein the servicing condition is further based upon the third shock strut pressure and the third shock strut temperature.

16 Claims, 7 Drawing Sheets

(58) Field of Classification Search
USPC .......................................................... 701/34
See application file for complete search history.

(56) References Cited

U.S. PATENT DOCUMENTS

| | | | |
|---|---|---|---|
| 8,886,402 B1 | 11/2014 | Lou | |
| 9,045,237 B2 | 6/2015 | Nance | |
| 9,285,007 B2 | 3/2016 | Fazeli et al. | |
| 9,387,924 B2 | 7/2016 | Fazeli et al. | |
| 2010/0017052 A1* | 1/2010 | Luce | B64C 25/60 |
| | | | 701/16 |
| 2014/0046533 A1 | 2/2014 | Nance | |
| 2015/0267769 A1* | 9/2015 | Fazeli | F16F 9/3264 |
| | | | 701/3 |
| 2015/0269794 A1* | 9/2015 | Fazeli | B64F 5/60 |
| | | | 701/34.4 |

OTHER PUBLICATIONS

ARP5908 Landing Gear Servicing Apr. 22, 2013 SAE International.
European Patent Office, European Search Report dated May 14, 2018 in Application No. 17187627.9-1001.

* cited by examiner

SHOCK STRUT SERVICE MONITORING USING GAS PRESSURE AND TEMPERATURE SENSORS, COMBINED WITH PHYSICAL STRUT MEASUREMENT AND TAKING INTO ACCOUNT GAS ABSORPTION/DESORPTION IN A FLUID

CROSS REFERENCE TO RELATED APPLICATIONS

This application claims priority to, and the benefit of, U.S. Provisional Patent Application Ser. No. 62/381,392, entitled "STRUT SERVICE MONITORING SYSTEM WITHOUT STROKE SENSOR," filed on Aug. 30, 2016. The '392 application is hereby incorporated by reference in its entirety for all purposes.

FIELD

The present disclosure relates to landing gear, and more particularly, to methods for servicing and monitoring shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Functionality and performance of a landing gear shock strut depends on internal gas and oil levels. Gas pressure and oil volume may be maintained within a design envelope to ensure that the landing gear functionality is within an acceptable range.

SUMMARY

A method for monitoring a shock strut is disclosed herein, in accordance with various embodiments. A method for monitoring a shock strut may comprise measuring a first shock strut pressure, measuring a first shock strut temperature, measuring a second shock strut pressure, measuring a second shock strut temperature, measuring a shock strut stroke, and determining a servicing condition of the shock strut based upon the first shock strut pressure, the first shock strut temperature, the second shock strut pressure, the second shock strut temperature, and the shock strut stroke and taking into account at least one of an absorption of a gas with a fluid and a desorption of the gas with the fluid.

In various embodiments, the method may further comprise measuring a third shock strut pressure, and measuring a third shock strut temperature. The first shock strut pressure may be measured during a flight and prior to a landing. The first shock strut temperature may be measured during the flight and prior to the landing. The second shock strut pressure may be measured after the landing. The second shock strut temperature may be measured after the landing. The shock strut stroke may be measured after the landing. The third shock strut pressure, the third shock strut temperature, and the shock strut stroke may be measured after the second shock strut pressure and the second shock strut temperature are measured. The third shock strut pressure and the third shock strut temperature may be measured at substantially the same time the shock strut stroke is measured. The absorption of the gas with the fluid and the desorption of the gas with the fluid may be determined based upon the first temperature and the first pressure, and the second temperature and the second pressure. The first shock strut pressure may be measured under static conditions. The first shock strut temperature may be measured under static conditions. The second shock strut pressure may be measured under static conditions. The second shock strut temperature may be measured under static conditions. The shock strut stroke may be measured under static conditions. The first shock strut pressure may be measured when the shock strut is in a fully extended position. The first shock strut temperature may be measured when the shock strut is in the fully extended position. The second shock strut pressure may be measured under a weight on wheels (WONW) condition. The second shock strut temperature may be measured under the WONW condition. The shock strut stroke may be measured under the WONW condition. The second shock strut pressure, the second shock strut temperature, the third shock strut pressure, the third shock strut temperature, and the shock strut stroke may be measured before a subsequent flight.

A method for monitoring a shock strut is disclosed herein, in accordance with various embodiments. A method for monitoring a shock strut may comprise calculating a servicing condition of the shock strut based upon a first shock strut pressure and a first shock strut temperature at a first time, a second shock strut pressure and a second shock strut temperature at a second time, and a third shock strut pressure, a third shock strut temperature, and a shock strut stroke at a third time, wherein the calculating comprises calculating a first number of moles of gas dissolved in a fluid and calculating a second number of moles of gas dissolved in the fluid.

In various embodiments, the first number of moles of gas may be the number of moles of gas dissolved in the fluid corresponding to the first time. The second number of moles of gas may be the number of moles of gas dissolved in the fluid corresponding to the second time. The first time may be during a flight of an aircraft with the shock strut in a fully extended position. The second time may be after the flight of the aircraft, after the aircraft has landed, and with the shock strut in a partially compressed position. The servicing condition may be calculated based upon the first shock strut pressure, the first shock strut temperature, the second shock strut pressure, the second shock strut temperature, the third shock strut pressure, the third shock strut temperature, and the shock strut stroke. The calculating may take into account at least one of an absorption of a gas with the fluid and a desorption of the gas with the fluid. The calculating the first number of moles of gas dissolved in the fluid may be calculated as $n_v{}^a = C(\hat{T}^a) \times \hat{P}^a$, where $n_v{}^a$ is the first number of moles of gas dissolved in the fluid corresponding to the first time, $C(\hat{T}^a)$ is a Henry's factor as a function of the first shock strut temperature, and $\hat{P}^a$ is the first shock strut pressure. The calculating the second number of moles of gas dissolved in the fluid may be calculated as $n_v{}^b = C(\hat{T}^b) \times \hat{P}^b$ where $n_v{}^b$ is the second number of moles of gas dissolved in the fluid corresponding to the second time, $C(\hat{T}^b)$ is a Henry's factor as a function of the second shock strut temperature, and $\hat{P}^b$ is the second shock strut pressure.

A shock strut monitoring system is disclosed herein, in accordance with various embodiments. The shock strut monitoring system may comprise a controller and a tangible, non-transitory memory configured to communicate with the controller, the tangible, non-transitory memory having instructions stored thereon that, in response to execution by the controller, cause the controller to perform operations comprising: receiving, by the controller, a first shock strut pressure and a first shock strut temperature at a first time; receiving, by the controller, a second shock strut pressure and a second shock strut temperature at a second time; receiving, by the controller, a shock strut stroke; and calculating, by the controller, a shock strut servicing condition, wherein the calculating the shock strut servicing condition comprises: calculating, by the controller, a first number of moles of gas dissolved in a fluid based upon the first shock strut temperature; and calculating, by the controller, a second number of moles of gas dissolved in the fluid based upon the second shock strut temperature.

In various embodiments, the operations may further comprise receiving, by the controller, a third shock strut pressure and a third shock strut temperature, wherein the third shock strut pressure, the third shock strut temperature, and the shock strut stroke are measured at a third time. The operations may further comprise sending, by the controller, the shock strut servicing condition to a display.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
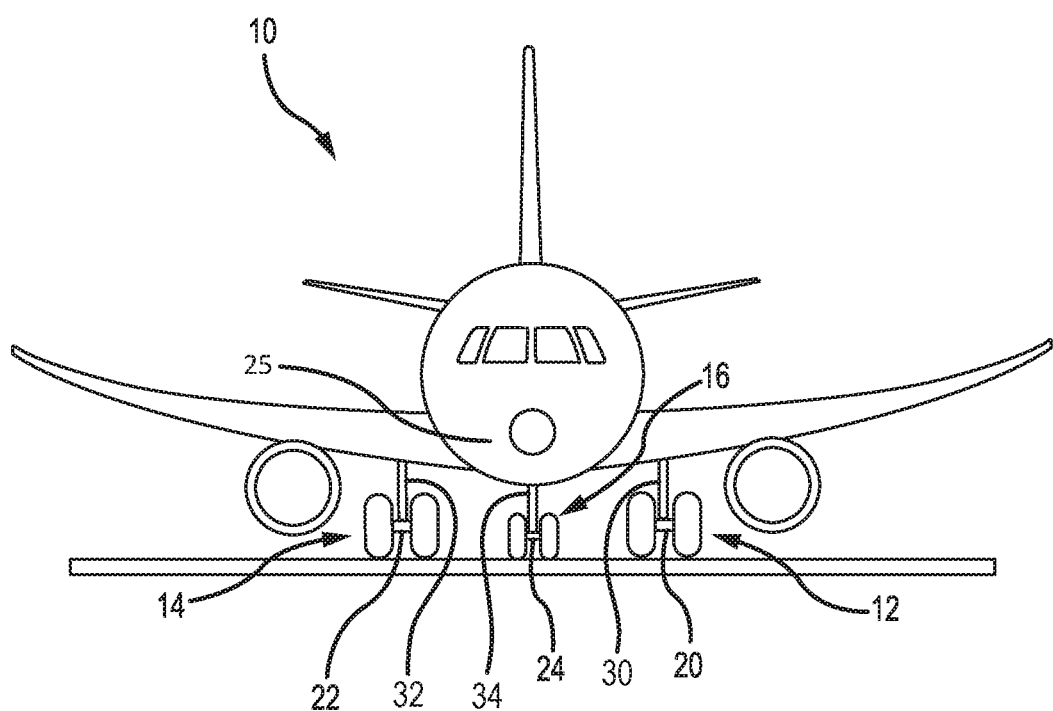
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Aircraft landing gear systems in accordance with the present disclosure may comprise a shock strut. A shock strut may comprise various fluids such as oil and gas. Performance of the shock strut may be evaluated by monitoring aspects of the shock strut, including gas temperature, gas pressure, and shock strut stroke of the shock strut under various conditions of the shock strut and aircraft. Shock strut stroke may refer to a shock strut piston position.

Gas curves used as springs in aircraft landing gear are typically calculated based upon a static test, where the shock strut is slowly compressed and decompressed, causing the pressure of the gas to slowly change in a manner to allow heat dissipation during the process. However, during operation of a vehicle, such as an aircraft for example, the shock strut may rapidly stroke causing rapid pressure changes in the gas, such as nitrogen for example, and allowing the gas to more freely move into and out a fluid, such as oil for example. During these rapid pressure changes (caused by stroking the shock absorber quickly), the oil constantly remains saturated with nitrogen. In contrast, when slowly changing the pressure during a static test, the nitrogen is not as free to go into and out of the oil and therefore can leave the oil & nitrogen in an un-balanced state; either over-saturated or under-saturated. Traditionally measured gas curves start at the fully extended position and stroke to the fully compressed condition and then back to the fully extended position. Assuming the gas and oil are at balance (oil fully saturated) at the start, as the strut is compressed and pressure increased, the oil becomes more under saturated as the higher pressure drives more nitrogen into solution, but the slow change prevents it. Systems and methods disclosed herein, take into account gas absorption and desorption in the fluid (e.g., gas entrainment within the fluid) resulting in more accurate measurements of shock strut servicing conditions, such as gas volume and oil volume. Systems and methods disclosed herein may accurately calculate a shock strut servicing condition, taking into account gas absorption and desorption in the fluid, without the need for a position sensor.

The following nomenclature in table 1 corresponds to various equations and parameters described in the present disclosure:

TABLE 1

| Nomenclature for equations 1-9 | |
|---|---|
| Nomenclature | |
| $V_{tot}$ | Total internal volume of the shock strut in the fully extended position |
| A | Piston area |
| a | Represents sensor readings and shock strut state before landing |
| b | Represents sensor readings and shock strut state after aircraft comes to full stop after landing |

TABLE 1-continued

Nomenclature for equations 1-9
Nomenclature

| | |
|---|---|
| c | Represents sensor readings at time of shock strut stroke measurement |
| $V_{gas}^a$ | Gas volume in state "a" (Unknown parameter 1) |
| $V_{gas}^b$ | Gas volume in state "b" (Unknown parameter 2) |
| $V_{gas}^c$ | Gas volume in state "c" (Unknown parameter 3) |
| $V_{oil}^a$ | Oil volume in state "a" (Unknown parameter 4) |
| $V_{oil}^b$ | Oil volume in state "b" (Unknown parameter 5) |
| $V_{oil}^c$ | Oil volume in state "c" (Unknown parameter 6) |
| $n_v^a$ | Number of moles of gas dissolved in oil in state "a" per unit volume of oil (Unknown parameter 7) (also referred to herein as a first number of moles of gas) |
| $n_v^b$ | Number of moles of gas dissolved in oil in state "b" per unit volume of oil (Unknown parameter 8) (also referred to herein as a second number of moles of gas) |
| $S^b$ | Shock strut stroke in state "b" per unit volume of oil (Unknown parameter 9) |
| $\hat{T}^a$ | Measured temperature in state "a" (also referred to herein as a first shock strut temperature) |
| $\hat{T}^b$ | Measured temperature in state "b" (also referred to herein as a second shock strut temperature) |
| $\hat{T}^c$ | Measured temperature in state "c"(also referred to herein as a third shock strut temperature) |
| $\hat{p}^a$ | Measured pressure in state "a" (also referred to herein as a first shock strut pressure) |
| $\hat{p}^b$ | Measured pressure in state "b" (also referred to herein as a second shock strut pressure) |
| $\hat{p}^c$ | Measured pressure in state "c" (also referred to herein as a third shock strut pressure) |
| $\hat{S}^c$ | Measured stroke in state "c" |
| C(T) | Henry's factor as a function of temperature |
| α | Oil thermal expansion coefficient |
| R | Universal Gas Constant |

TABLE 2

Nomenclature for equations 10-15
Nomenclature

| | |
|---|---|
| $V_{tot}$ | Total internal volume of the shock strut in the fully extended position |
| A | Piston area |
| a | Represents sensor readings and shock strut state before landing |
| b | Represents sensor readings and shock strut state after aircraft comes to full stop after landing |
| $V_{gas}^a$ | Gas volume in state "a" (Unknown parameter 1) |
| $V_{gas}^b$ | Gas volume in state "b" (Unknown parameter 2) |
| $V_{oil}^a$ | Oil volume in state "a" (Unknown parameter 3) |
| $V_{oil}^b$ | Oil volume in state "b" (Unknown parameter 4) |
| $n_v^a$ | Number of moles of gas dissolved in oil in state "a" per unit volume of oil (Unknown parameter 5) (also referred to herein as a first number of moles of gas) |
| $n_v^b$ | Number of moles of gas dissolved in oil in state "b" per unit volume of oil (Unknown parameter 6) (also referred to herein as a second number of moles of gas) |
| $\hat{S}^b$ | Measured stroke in state "b." |
| $\hat{T}^a$ | Measured temperature in state "a" (also referred to herein as a first shock strut temperature) |
| $\hat{T}^b$ | Measured temperature in state "b" (also referred to herein as a second shock strut temperature) |
| $\hat{p}^a$ | Measured pressure in state "a" (also referred to herein as a first shock strut pressure) |
| $\hat{p}^b$ | Measured pressure in state "b" (also referred to herein as a second shock strut pressure) |
| C(T) | Henry's factor as a function of temperature |
| α | Oil thermal expansion coefficient |
| R | Universal Gas Constant |

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include shock strut 30 and wheel assembly 20. Landing gear 14 may include shock strut 32 and wheel assembly 22. Landing gear 16 may include shock strut 34 and nose wheel assembly 24. Aircraft 10 may comprise a controller 25. Landing gear 14 may be in communication with controller 25 and may send information to controller 25, for example, shock strut pressure and temperature information.

In various embodiments, controller 25 may comprise one or more processors. Controller 25 may comprise hardware having a tangible, non-transitory memory configured to communicate with controller 25 and having instructions stored thereon that cause controller 25 to perform various operations as described herein (e.g., method 400, method 500, method 600, and/or method 700).

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 2:
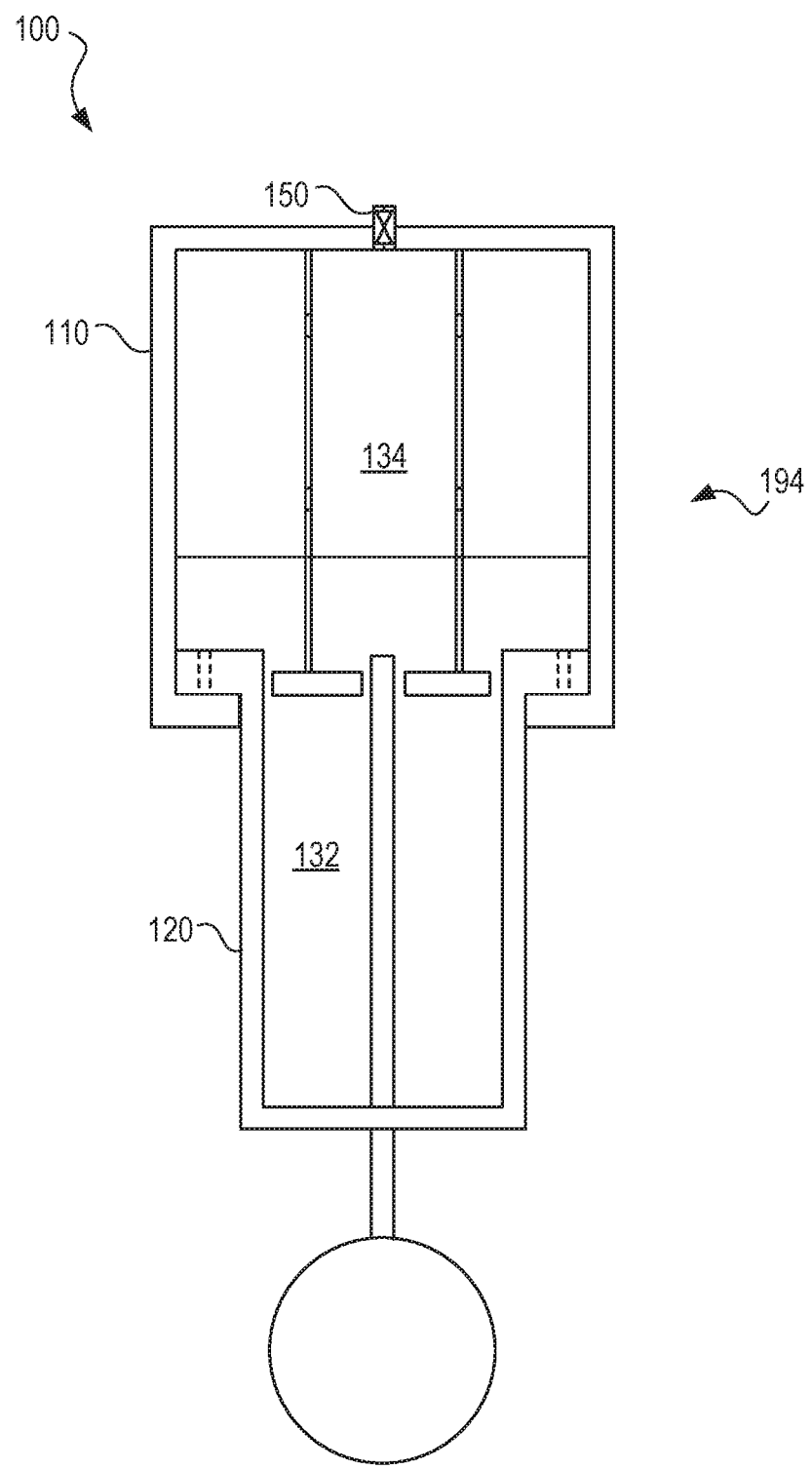
FIG. 2 illustrates a schematic view of a shock strut in a fully extended position, in accordance with various embodiments.

With reference to FIG. 2, a shock strut 100 is illustrated, in accordance with various embodiments. Shock strut 32 of FIG. 1 may be similar to shock strut 100. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. In various embodiments, a liquid 132, such as a hydraulic fluid and/or oil may be located within strut cylinder 110. Further, a gas 134, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

In various embodiments, shock strut 100 may be installed onto a landing gear of an aircraft. FIG. 1 illustrates shock strut 100 in a fully extended position 194, such as when an aircraft is in flight for example. Various parameters measured and/or calculated herein that correspond to fully extended position 194 may be referred to herein with a superscript "a." Said parameters may be measured during flight of an aircraft. Said parameters may be measured within a pre-determined duration of a landing event of the aircraft, such as within an hour of the landing event for example. During a landing event, shock strut 100 may be compressed wherein strut piston 120 translates into strut cylinder 110. The pressure of liquid 132 and gas 134 may increase in response to shock strut 100 being compressed.

In various embodiments, an integrated pressure/temperature sensor 150 may be installed on shock strut 100. Integrated pressure/temperature sensor 150 may be configured to measure the pressure and temperature of gas 134. Although depicted as an integrated pressure/temperature sensor 150, it is contemplated herein that an individual temperature sensor and an individual pressure sensor may be used in place of integrated pressure/temperature sensor 150 without departing from the scope of this disclosure. For example, a pressure sensor may be mounted on shock strut 100 and a separate temperature sensor may be located in proximity to shock strut 100. Stated differently, the temperature of gas 134 may be measured indirectly. In this regard, as used herein the term "first sensor" may refer to integrated pressure/temperature sensor 150 or may refer to an individual pressure sensor and the term "second sensor" may refer to integrated pressure/temperature sensor 150 or may refer to an individual temperature sensor.

Figure 3:
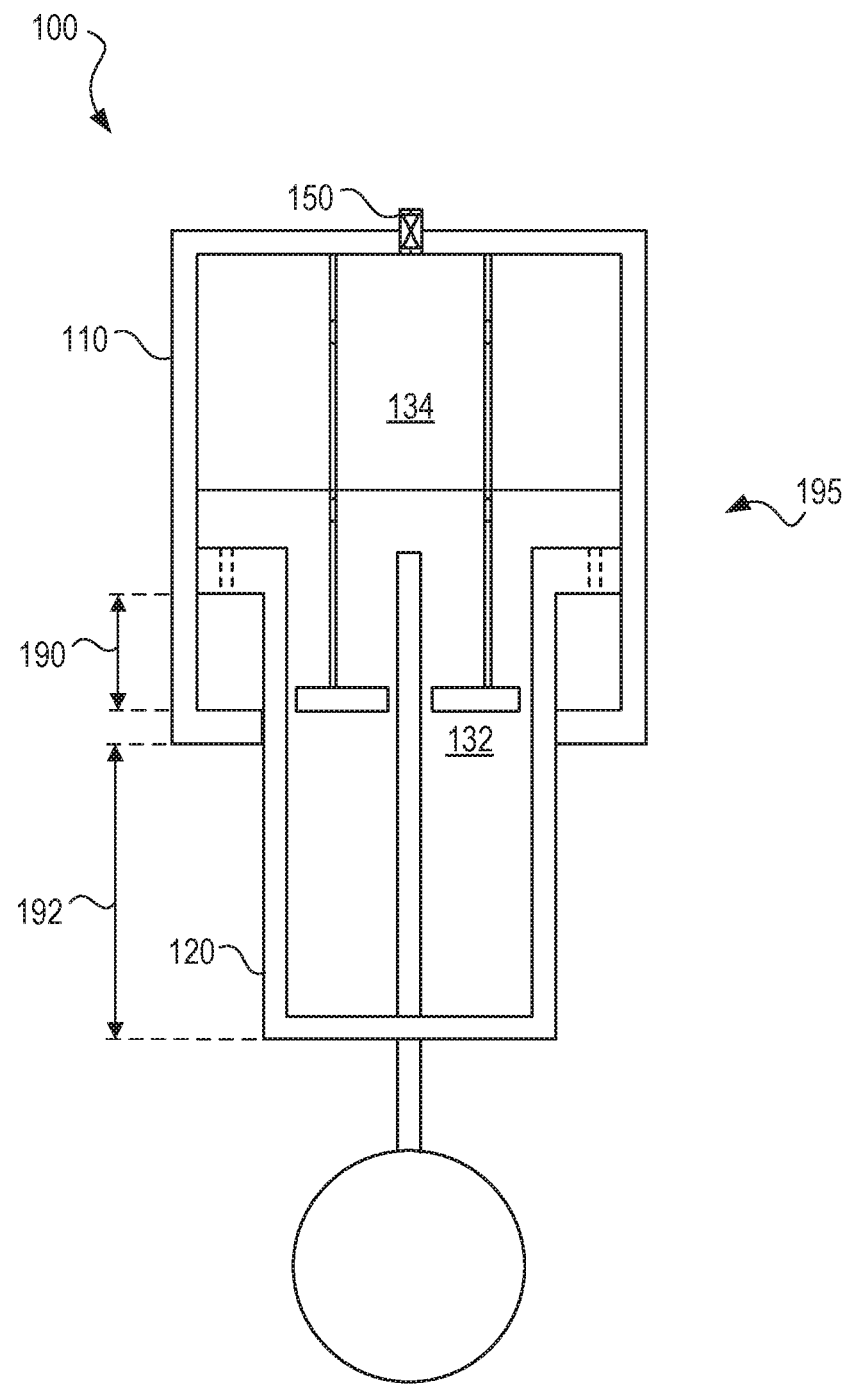
FIG. 3 illustrates a schematic view of the shock strut of FIG. 2 in a partially compressed position corresponding to an aircraft in a static condition, in accordance with various embodiments.

With reference to FIG. 3, shock strut 100 is illustrated in a partially compressed position (also referred to herein as a compressed position) 195. Shock strut 100 may compress in a weight on wheels (WONW) condition, such as when an aircraft is supported by its wheels on the ground. In various embodiments, compressed position 195 may be a static position when an aircraft is supported on the ground by shock strut 100. In various embodiments, various parameters measured and/or calculated herein that correspond to compressed position 195 may be referred to herein with a superscript "b" (e.g., step 440 and step 450 of FIG. 4). Said parameters may be measured within a pre-determined duration after a landing event of an aircraft, such as within minutes after the aircraft is landed and not moving relative to the ground. For example, a controller (e.g., controller 25 of FIG. 1) may determine that an aircraft has landed and is stationary by monitoring the pressure within shock strut 100. Various parameters measured and/or calculated herein that correspond to compressed position 195 may be referred to herein with a superscript "c" (e.g., step 450, step 460, and step 470 of FIG. 4). Said parameters may be measured after the aforementioned landing event and before the next take-off of the aircraft. As previously mentioned, strut piston 120 may be received by strut cylinder 110. The position of strut piston 120 relative to strut cylinder 110 may be measured as shock strut stroke 190. Shock strut stroke 190 may correspond to a distance that strut piston 120 has moved relative to the fully extended position 194 (see FIG. 2) relative to strut cylinder 110. Shock strut stroke 190 may be measured directly or indirectly. For example, shock strut stroke 190 may be indirectly measured by measuring a shock strut extension 192.

Figure 4:
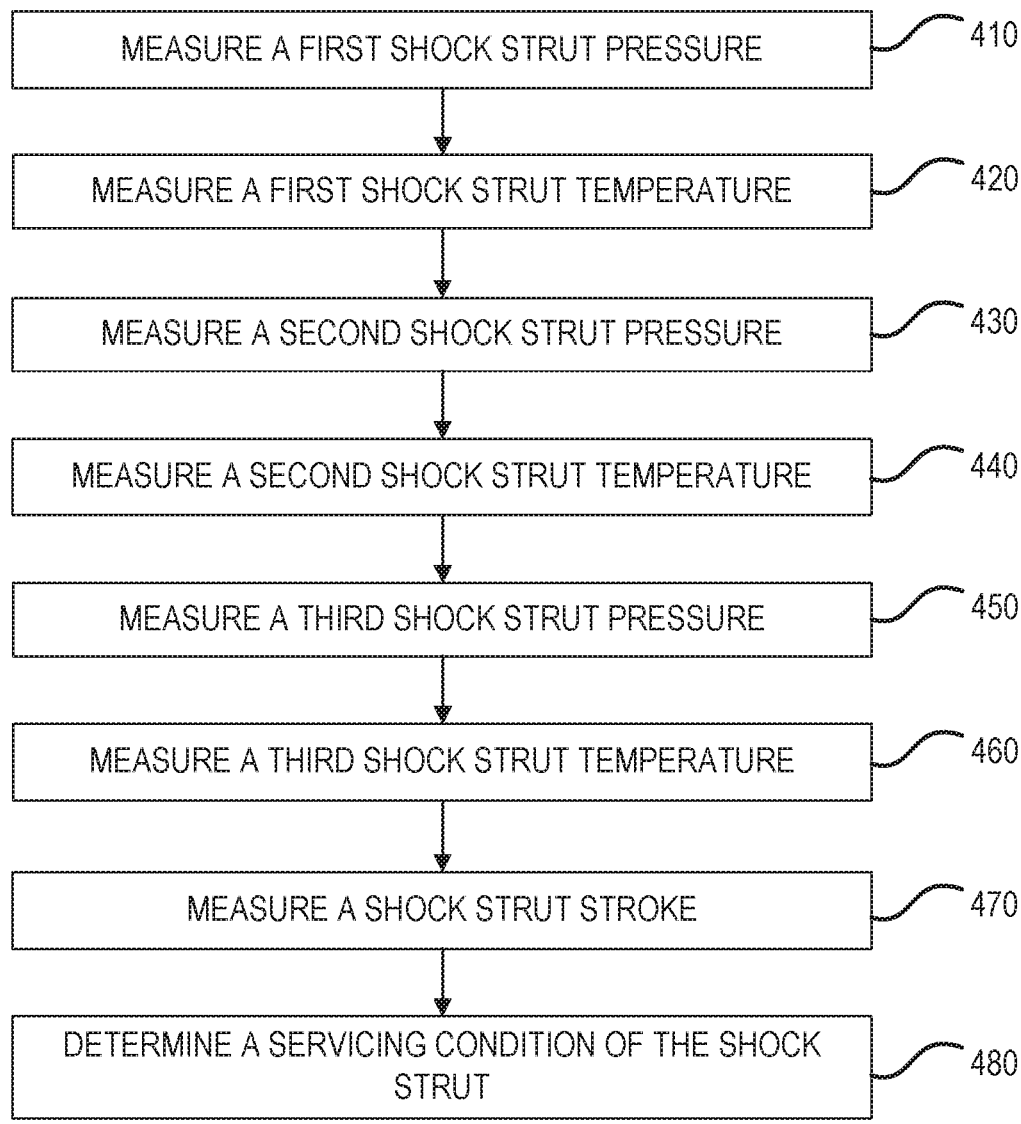
FIG. 4 and FIG. 5 illustrate methods for monitoring a shock strut utilizing a set of nine equations with nine unknown values, in accordance with various embodiments.

With reference to FIG. 4, a method 400 for monitoring a shock strut for determining a servicing condition is provided, in accordance with various embodiments. As used herein, the term "servicing condition" may refer to an oil volume within a shock strut, a gas pressure within the shock strut, and/or a gas volume within the shock strut.

Method 400 includes measuring a first shock strut pressure (step 410). With combined reference to FIG. 2 and FIG. 4, step 410 may include measuring the pressure of gas 134 within shock strut 100. In various embodiments, step 410 may include measuring, by a first sensor (e.g., integrated pressure/temperature sensor 150), the pressure of gas 134 in shock strut 100. Method 400 includes measuring a first shock strut temperature (step 420). Step 420 may include measuring a temperature corresponding to the temperature of shock strut 100. In various embodiments, step 420 may include measuring, by a second sensor (e.g., integrated pressure/temperature sensor 150), a temperature corresponding to the temperature of gas 134 in shock strut 100. In various embodiments, with additional reference to FIG. 1, step 410 and step 420 may be performed while aircraft 10 is in flight and before a landing event (also referred to herein as a first time).

Method 400 includes measuring a second shock strut pressure (step 430). With combined reference to FIG. 3 and FIG. 4, step 430 may include measuring the pressure of gas 134 in shock strut 100. In various embodiments, step 430 may include measuring, by the first sensor (e.g., integrated pressure/temperature sensor 150), the pressure of gas 134 in shock strut 100. Method 400 includes measuring a second shock strut temperature (step 440). Step 440 may include measuring a temperature corresponding to the temperature of shock strut 100. In various embodiments, step 440 may include measuring, by the second sensor (e.g., integrated pressure/temperature sensor 150), a temperature corresponding to the temperature of gas 134 in shock strut 100. In various embodiments, with additional reference to FIG. 1, step 430 and step 440 may be performed after a landing event (also referred to herein as a second time), such as after aircraft 10 has landed and is no longer moving relative to the ground. When aircraft 10 is stationary, the temperature and pressure readings may comprise static temperatures and pressures.

Method 400 includes measuring a third shock strut pressure (step 450). With combined reference to FIG. 3 and FIG. 4, step 450 may include measuring the pressure of gas 134 in shock strut 100. In various embodiments, step 450 may include measuring, by the first sensor (e.g., integrated pressure/temperature sensor 150), the pressure of gas 134 in shock strut 100. Method 400 includes measuring a third shock strut temperature (step 460). Step 460 may include measuring a temperature corresponding to the temperature of shock strut 100. In various embodiments, step 460 may include measuring, by the second sensor (e.g., integrated pressure/temperature sensor 150), a temperature corresponding to the temperature of gas 134 in shock strut 100. In various embodiments, with additional reference to FIG. 1, step 450 and step 460 may be performed after step 430 and step 440. Step 450 and step 460 may be performed after aircraft 10 has landed and is no longer moving relative to the ground (also referred to herein as a third time). Method 400 includes measuring a shock strut stroke (step 470). With combined reference to FIG. 3 and FIG. 4, step 470 may include measuring shock strut stroke 190. Shock strut stroke 190 may be measured directly or may be measured indirectly by measuring shock strut extension 192. Shock strut stroke 190 may be measured manually. The shock strut stroke 190 may be provided to controller 25, with momentary reference to FIG. 1. In various embodiments, step 470 may be performed when shock strut 100 is in the compressed position 195. Shock strut stroke 190 may be measured at the third time.

In various embodiments, step 410 and step 420 may be performed at substantially the same time, for example within minutes of each other. In various embodiments, step 430 and step 440 may be performed at substantially the same time, for example within minutes of each other. In various embodiments, step 450, step 460, and step 470 may be performed at substantially the same time, for example within minutes of each other. In various embodiments, step 430 and step 440 may be performed after step 410 and step 420. In various embodiments, step 450, step 460, and step 470 may be performed after step 430 and step 440 and before a subsequent flight. In various embodiments, step 410, step 420, step 430, step 440, step 450, step 460, and step 470 may be performed within a pre-determined period, for example within a 48 hour period, and in various embodiments, within a 24 hour period.

Method 400 includes determining a servicing condition of the shock strut (step 480). Step 480 may include determining the volume of liquid 132 within shock strut 100, the pressure of gas 134 within shock strut 100, and/or the volume of gas 134 within shock strut 100. The servicing condition of shock strut 100 may be determined in accordance with various embodiments.

In various embodiments, the servicing condition of shock strut 100 may be determined by solving a set of equations as provided below with reference to equations 1 through 9. Equations 1 through 9 include nine equations and nine unknown values and thus may be solved as a set of equations.

$$V_{tot} = V_{gas}^a + V_{oil}^a \quad \text{Eq. (1)}$$

$$n_v^a = C(\hat{T}^a) \times \hat{P}^a \quad \text{Eq. (2)}$$

$$V_{tot} - A\hat{S}^b = V_{gas}^b + V_{oil}^b \quad \text{Eq. (3)}$$

$$V_{oil}^b = V_{oil}^a \times \left(1 + \alpha(\hat{T}^b - \hat{T}^a)\right) \quad \text{Eq. (4)}$$

$$n_v^b = C(\hat{T}^b) \times \hat{P}^b \quad \text{Eq. (5)}$$

$$\frac{\hat{P}^a V_{gas}^a}{R\hat{T}^a} = \frac{\hat{P}^b V_{gas}^b}{R\hat{T}^b} + V_{oil}^b \times n_v^b - V_{oil}^a \times n_v^a \quad \text{Eq. (6)}$$

$$V_{tot} - A\hat{S}^c = V_{gas}^c + V_{oil}^c \quad \text{Eq. (7)}$$

$$\frac{\hat{P}^b V_{gas}^b}{R\hat{T}^b} = \frac{\hat{P}^c V_{gas}^c}{R\hat{T}^c} \quad \text{Eq. (8)}$$

$$V_{oil}^c = V_{oil}^b \times \left(1 + \alpha(\hat{T}^c - \hat{T}^b)\right) \quad \text{Eq. (9)}$$

Without being bound by theory, Henry's factor ($C(\hat{T})$) may be calculated based upon Henry's Law, which states that at a constant temperature, the amount of a gas that dissolves in a liquid is directly proportional to the partial pressure of that gas in equilibrium with that liquid. In various embodiments, in addition to pressure, Henry's factor ($C(\hat{T})$) is calculated as a function of temperature. In various embodiments, Henry's factor ($C(\hat{T})$) may be calculated using a pre-determined formula corresponding to the particular type of liquid 132 in shock strut 100. Calculating Henry's factor ($C(\hat{T})$) as a function of temperature may allow for a more accurate calculation of the servicing condition of shock strut 100. In this regard, the servicing condition of shock strut 100 may take into account absorption of gas 134 with liquid 132 and/or desorption of gas 134 with liquid 132.

In various embodiments, parameters such as piston area (A) and oil thermal expansion coefficient (a) may be stored in the tangible, non-transitory memory of controller 25, with momentary reference to FIG. 1.

Figure 5:
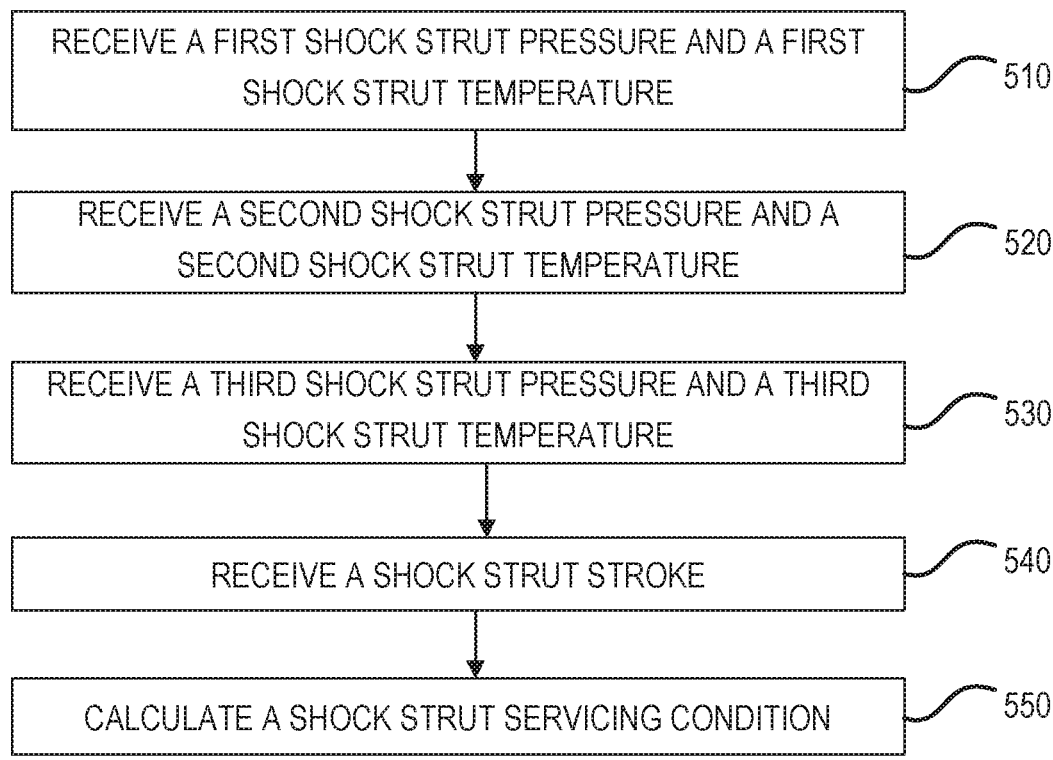

With reference to FIG. 5, a method 500 for monitoring a shock strut is provided, in accordance with various embodiments. Method 500 includes receiving a first shock strut pressure and a first shock strut temperature (step 510). Method 500 includes receiving a second shock strut pressure and a second shock strut temperature (step 520). Method 500 includes receiving a third shock strut pressure and a third shock strut temperature (step 530). Method 500 includes receiving a shock strut stroke (step 540). Method 500 includes calculating a shock strut servicing condition (step 550).

With combined reference to FIG. 1, FIG. 2, FIG. 3, and FIG. 5, step 510 may include receiving, by controller 25, first shock strut pressure ($\hat{P}^a$) and first shock strut temperature ($\hat{T}^a$) (step 510) from integrated pressure/temperature sensor 150. Step 520 may include receiving, by controller 25, second shock strut pressure ($\hat{P}^b$) and a second shock strut temperature ($\hat{T}^b$) from integrated pressure/temperature sensor 150. Step 530 may include receiving, by controller 25, third shock strut pressure ($\hat{P}^c$) and a third shock strut temperature ($\hat{T}^c$) from integrated pressure/temperature sensor 150. Step 540 may include receiving, by controller 25, shock strut stroke ($\hat{S}^c$). In various embodiments, a technician may enter shock strut stroke ($\hat{S}^c$) into an input device, such as a keyboard for example, to controller 25. Shock strut stroke ($\hat{S}^c$) may be measured manually, for example using a measuring device such as a ruler or tape measure. However, it is contemplated herein that in various embodiments shock strut stroke ($\hat{S}^c$) may be measured automatically, such as via a position sensor for example. Step 550 may include calculating, by controller 25, a shock strut servicing condition using equations 1 through equation 9 as disclosed herein.

In various embodiments, the servicing condition of shock strut 100 may be sent to a display after being calculated. For example, with momentary reference to FIG. 1, the servicing condition of shock strut 100 may be sent, by controller 25, to a display and a technician may service shock strut 100 based upon the servicing condition.

Having described a method for determining a servicing condition of shock strut 100 by solving a set of equations including equations 1 through 9, it is further contemplated that a servicing condition of shock strut 100 may be determined by solving equations 10 through 15, including six equations and six unknown values.

$$V_{tot} = V_{gas}^a + V_{oil}^a \quad \text{Eq. (10)}$$

$$n_v^a = C(\hat{T}^a) \times \hat{P}^a \quad \text{Eq. (11)}$$

$$V_{tot} - A\hat{S}^b = V_{gas}^b + V_{oil}^b \quad \text{Eq. (12)}$$

$$V_{oil}^b = V_{oil}^a \times \left(1 + \alpha(\hat{T}^b - \hat{T}^a)\right) \quad \text{Eq. (13)}$$

$$n_v^b = C(\hat{T}^b) \times \hat{P}^b \quad \text{Eq. (14)}$$

$$\frac{\hat{P}^a V_{gas}^a}{R\hat{T}^a} = \frac{\hat{P}^b V_{gas}^b}{R\hat{T}^b} + V_{oil}^b \times n_v^b - V_{oil}^a \times n_v^a \quad \text{Eq. (15)}$$

Figure 6:
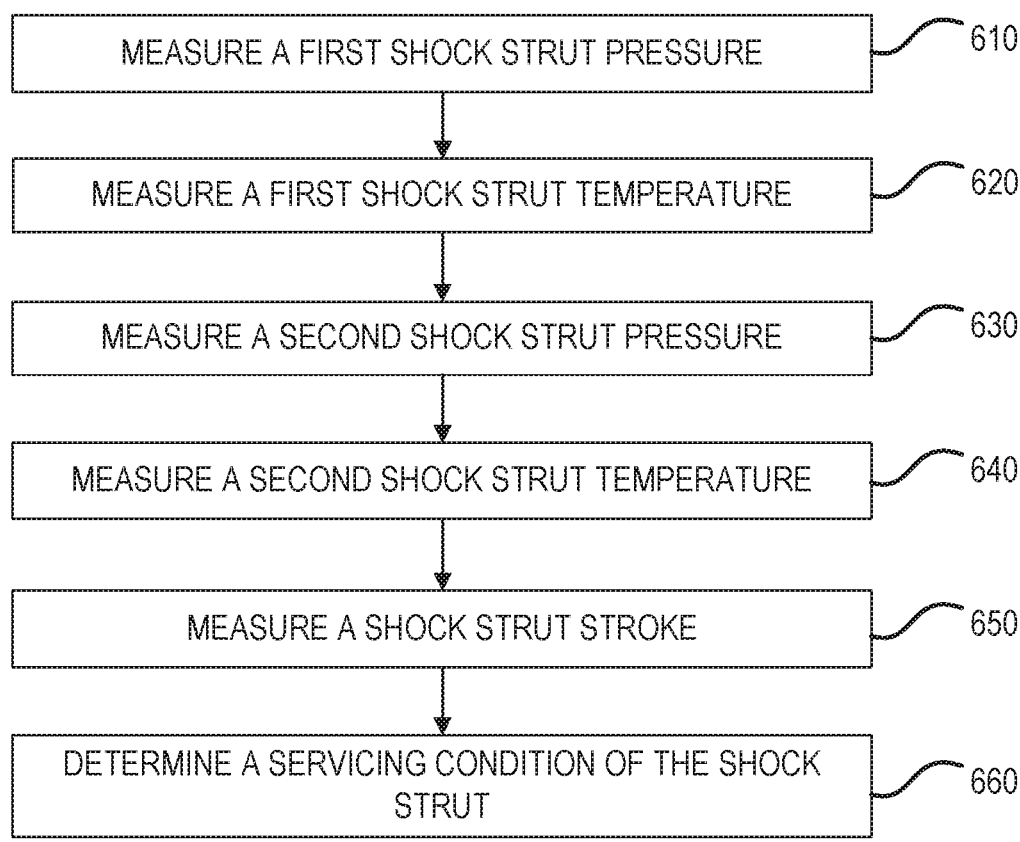
FIG. 6 and FIG. 7 illustrate methods for monitoring a shock strut utilizing a set of six equations with six unknown values, in accordance with various embodiments.

In this regard, with reference to FIG. 6, a method 600 for monitoring a shock strut for determining a servicing condition is provided, in accordance with various embodiments. Method 600 includes measuring a first shock strut pressure (step 610). With combined reference to FIG. 2 and FIG. 6, step 610 may include measuring the pressure of gas 134 within shock strut 100. In various embodiments, step 610 may include measuring, by a first sensor (e.g., integrated pressure/temperature sensor 150), the pressure of gas 134 in shock strut 100. Method 600 includes measuring a first shock strut temperature (step 620). Step 620 may include measuring a temperature corresponding to the temperature of shock strut 100. In various embodiments, step 620 may include measuring, by a second sensor (e.g., integrated pressure/temperature sensor 150), a temperature corresponding to the temperature of gas 134 in shock strut 100. In various embodiments, with additional reference to FIG. 1, step 610 and step 620 may be performed while aircraft 10 is in flight and before a landing event (also referred to herein as a first time).

Method 600 includes measuring a second shock strut pressure (step 630). With combined reference to FIG. 3 and FIG. 6, step 630 may include measuring the pressure of gas 134 in shock strut 100. In various embodiments, step 630 may include measuring, by the first sensor (e.g., integrated pressure/temperature sensor 150), the pressure of gas 134 in shock strut 100. Method 600 includes measuring a second shock strut temperature (step 640). Step 640 may include measuring a temperature corresponding to the temperature of shock strut 100. In various embodiments, step 640 may include measuring, by the second sensor (e.g., integrated pressure/temperature sensor 150), a temperature corresponding to the temperature of gas 134 in shock strut 100. In various embodiments, with additional reference to FIG. 1, step 630 and step 640 may be performed after a landing event (also referred to herein as a second time), such as after aircraft 10 has landed and is no longer moving relative to the ground. When aircraft 10 is stationary, the temperature and pressure readings may comprise static temperatures and pressures.

Method 600 includes measuring a shock strut stroke (step 650). With combined reference to FIG. 3 and FIG. 6, step 650 may include measuring shock strut stroke 190. Shock strut stroke 190 may be measured directly or may be measured indirectly by measuring shock strut extension 192. Shock strut stroke 190 may be measured manually or automatically. The shock strut stroke 190 may be provided to controller 25, with momentary reference to FIG. 1. In various embodiments, step 650 may be performed when shock strut 100 is in the compressed position 195. Shock strut stroke 190 may be measured at the second time.

Method 600 includes determining a servicing condition of the shock strut (step 660). Step 660 may include determining the volume of liquid 132 within shock strut 100, the pressure of gas 134 within shock strut 100, and/or the volume of gas 134 within shock strut 100. The servicing condition of shock strut 100 may be determined by solving equations 10 through 15 provided herein.

Figure 7:
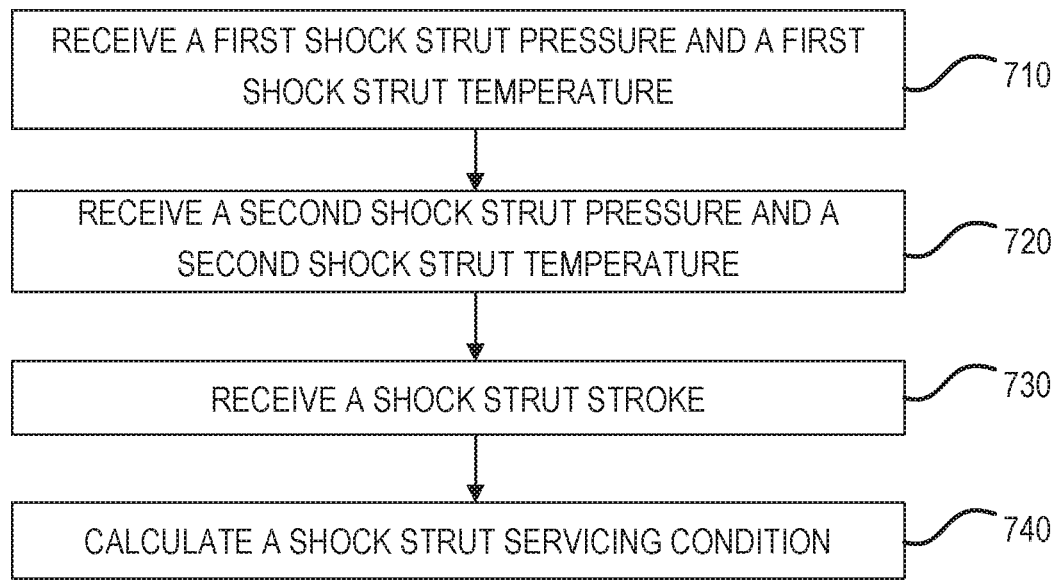

In this regard, with reference to FIG. 7, a method 700 for monitoring a shock strut is provided, in accordance with various embodiments. Method 700 includes receiving a first shock strut pressure and a first shock strut temperature (step 710). Method 700 includes receiving a second shock strut pressure and a second shock strut temperature (step 720). Method 700 includes receiving a shock strut stroke (step 730). Method 700 includes calculating a shock strut servicing condition (step 740).

With combined reference to FIG. 1, FIG. 2, FIG. 3, and FIG. 7, step 710 may include receiving, by controller 25, first shock strut pressure ($\hat{P}^a$) and first shock strut temperature ($\hat{T}^a$) (step 710) from integrated pressure/temperature sensor 150. Step 720 may include receiving, by controller 25, second shock strut pressure ($\hat{P}^b$) and a second shock strut temperature ($\hat{T}^b$) from integrated pressure/temperature sensor 150. Step 730 may include receiving, by controller 25, shock strut stroke ($\hat{S}^c$). In various embodiments, a technician may enter shock strut stroke ($\hat{S}^c$) into an input device, such as a keyboard for example, to controller 25. Shock strut stroke ($\hat{S}^c$) may be measured manually, for example using a measuring device such as a ruler or tape measure. Step 740 may include calculating, by controller 25, a shock strut servicing condition using equations 10 through equation 15 as disclosed herein.

In various embodiments, the servicing condition of shock strut 100 may be sent to a display after being calculated. For example, with momentary reference to FIG. 1, the servicing condition of shock strut 100 may be sent, by controller 25, to a display and a technician may service shock strut 100 based upon the servicing condition.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring a shock strut, comprising:
measuring a first shock strut pressure and a first shock strut temperature at a first time during a flight and prior to a landing, with the shock strut in a fully extended, static position;
measuring a second shock strut pressure and a second shock strut temperature at a second time after the landing, with the shock strut in a compressed, static position;
measuring a shock strut stroke, a third shock strut pressure, and a third shock strut temperature at a third time after the second time and before a subsequent flight, with the shock strut in the compressed, static position; and
determining a servicing condition of the shock strut based upon the first shock strut pressure, the first shock strut temperature, the second shock strut pressure, the second shock strut temperature, the shock strut stroke, the third shock strut pressure, the third shock strut temperature, and at least one of an absorption of a gas with a fluid and a desorption of the gas with the fluid.

2. The method of claim 1,
wherein the third shock strut pressure and the third shock strut temperature are measured at substantially the same time the shock strut stroke is measured.

3. The method of claim 1, wherein the absorption of the gas with the fluid and the desorption of the gas with the fluid is determined based upon the first temperature and the first pressure, and the second temperature and the second pressure.

4. The method of claim 1, wherein:
the first shock strut pressure is measured under static conditions;
the first shock strut temperature is measured under static conditions;
the second shock strut pressure is measured under static conditions;
the second shock strut temperature is measured under static conditions; and
the shock strut stroke is measured under static conditions.

5. The method of claim 1, wherein:
the second shock strut pressure is measured under a weight on wheels (WONW) condition;
the second shock strut temperature is measured under the WONW condition; and
the shock strut stroke is measured under the WONW condition.

6. A method for monitoring a shock strut, comprising:
calculating a servicing condition of the shock strut based upon:
a first shock strut pressure and a first shock strut temperature measured at a first time during a flight and prior to a landing, with the shock strut in a fully extended, static position;
a second shock strut pressure and a second shock strut temperature measured at a second time after the landing, with the shock strut in a compressed, static position; and
a third shock strut pressure, a third shock strut temperature, and a shock strut stroke at a third time after the second time and before a subsequent flight, with the shock strut in the compressed, static position;
wherein the calculating comprises:
calculating a first number of moles of gas dissolved in a fluid; and
calculating a second number of moles of gas dissolved in the fluid.

7. The method of claim 6, wherein the first number of moles of gas is the number of moles of gas dissolved in the fluid corresponding to the first time.

8. The method of claim 6, wherein the second number of moles of gas is the number of moles of gas dissolved in the fluid corresponding to the second time.

9. The method of claim 6, wherein the servicing condition is calculated based upon the first shock strut pressure, the first shock strut temperature, the second shock strut pressure, the second shock strut temperature, the third shock strut pressure, the third shock strut temperature, and the shock strut stroke.

10. The method of claim 6, wherein the calculating takes into account at least one of an absorption of a gas with the fluid and a desorption of the gas with the fluid.

11. The method of claim 6, wherein the calculating the first number of moles of gas dissolved in the fluid is calculated as $n_v^a = C(\hat{T}^a) \times \hat{P}^a$, where $n_v^a$ is the first number of moles of gas dissolved in the fluid corresponding to the first time, $C(\hat{T}^a)$ is a Henry's factor as a function of the first shock strut temperature, and $\hat{P}^a$ is the first shock strut pressure.

12. The method of claim 6, wherein the calculating the second number of moles of gas dissolved in the fluid is calculated as $n_v^b = C(\hat{T}^b) \times \hat{P}^b$, where $n_v^b$ is the second number of moles of gas dissolved in the fluid corresponding to the second time, $C(\hat{T}^b)$ is a Henry's factor as a function of the second shock strut temperature, and $\hat{P}^b$ is the second shock strut pressure.

13. A shock strut monitoring system, comprising:
a controller; and
a tangible, non-transitory memory configured to communicate with the controller, the tangible, non-transitory memory having instructions stored thereon that, in response to execution by the controller, cause the controller to perform operations comprising:
receiving, by the controller, a first shock strut pressure and a first shock strut temperature measured at a first time during a flight and prior to a landing with the shock strut in a fully extended, static position;
receiving, by the controller, a second shock strut pressure and a second shock strut temperature measured at a second time after the landing, with the shock strut in a compressed, static position; and
receiving, by the controller, a shock strut stroke measured with the shock strut in a static condition; and
calculating, by the controller, a shock strut servicing condition, wherein the calculating the shock strut servicing condition comprises:
calculating, by the controller, a first number of moles of gas dissolved in a fluid based upon the first shock strut temperature; and
calculating, by the controller, a second number of moles of gas dissolved in the fluid based upon the second shock strut temperature.

14. The shock strut monitoring system of claim 13, wherein the operations further comprise receiving, by the controller, a third shock strut pressure and a third shock strut temperature, wherein the third shock strut pressure, the third shock strut temperature, and the shock strut stroke are measured at a third time after the second time and before a subsequent flight, with the shock strut in the compressed, static position.

15. The shock strut monitoring system of claim 13, further comprising sending, by the controller, the shock strut servicing condition to a display.

16. The method of claim 1, wherein the servicing condition of the shock strut is determined by solving a set of equations:

$$V_{tot} = V_{gas}^a + V_{oil}^a \quad \text{Eq. (1)}$$

$$n_v^a = C(\hat{T}^a) \times \hat{P}^a \quad \text{Eq. (2)}$$

$$V_{tot} - AS^b = V_{gas}^b + V_{oil}^b \quad \text{Eq. (3)}$$

$$V_{oil}^b = V_{oil}^a \times \left(1 + \alpha(\hat{T}^b - \hat{T}^a)\right) \quad \text{Eq. (4)}$$

$$n_v^b = C(\hat{T}^b) \times \hat{P}^b \quad \text{Eq. (5)}$$

$$\frac{\hat{P}^a V_{gas}^a}{R\hat{T}^a} = \frac{\hat{P}^b V_{gas}^b}{R\hat{T}^b} + V_{oil}^b \times n_v^b - V_{oil}^a \times n_v^a \quad \text{Eq. (6)}$$

$$V_{tot} - A\hat{S}^c = V_{gas}^c + V_{oil}^c \quad \text{Eq. (7)}$$

$$\frac{\hat{P}^b V_{gas}^b}{R\hat{T}^b} = \frac{\hat{P}^c V_{gas}^c}{R\hat{T}^c} \quad \text{Eq. (8)}$$

$$V_{oil}^c = V_{oil}^b \times \left(1 + \alpha(\hat{T}^c - \hat{T}^b)\right) \quad \text{Eq. (9)}$$

wherein:
$V_{tot}$ is a total internal volume of the shock strut in the fully extended position;
A is a piston area;
a represents sensor readings and shock strut state at the first time;
b represents sensor readings and shock strut state at the second time;
c represents sensor readings and shock strut state at the third time;
$V_{gas}^a$ is a gas volume in state "a" (parameter 1);
$V_{gas}^b$ is a gas volume in state "b" (unknown parameter 2);
$V_{gas}^c$ is a gas volume in state "c" (own parameter 3);
$V_{oil}^a$ is an oil volume in state "a" (unknown parameter 4);
$V_{oil}^b$ is an oil volume in state "b" (unknown parameter 5);
$V_{oil}^c$ is an oil volume in state "C" (unknown parameter 6);
$n_v^a$ is a first number of moles of gas (unknown parameter 7);
$n_v^b$ is a second number of moles of gas (unknown parameter 8);
$S^b$ is a shock strut stroke in state "b" (unknown parameter 9);
$\hat{T}^a$ the first shock strut temperature in state "c";
$\hat{T}^b$ is the second shock strut temperature in state "c";
$\hat{T}^c$ is the third shock strut temperature in state "c";
$\hat{P}^a$ is the first shock strut pressure in state "a";
$\hat{P}^b$ is the second shock strut pressure in state "b";
$\hat{P}^c$ is the third shock strut pressure in state "c";
$\hat{S}^c$ is the shock strut stroke in state "C";
C(T) is Henry's factor as a function of temperature;
α is an oil thermal expansion coefficient; and
R is a universal gas constant.

\* \* \* \* \*